(12) United States Patent
Offidani (10) Patent No.: US 12,484,859 B2
(45) Date of Patent: Dec. 2, 2025

(54) SYSTEM, APPARATUS, AND METHOD FOR PREDICTING ACUTE CORONARY SYNDROME VIA IMAGE RECOGNITION

(71) Applicant: Click Therapeutics, Inc., New York, NY (US)

(72) Inventor: Emanuela Offidani, Brooklyn, NY (US)

(73) Assignee: Click Therapeutics, Inc., New York, NY (US)

( * ) Notice: Subject to any disclaimer, the term of this patent is extended or adjusted under 35 U.S.C. 154(b) by 624 days.

(21) Appl. No.: 17/769,692

(22) PCT Filed: Oct. 16, 2020

(86) PCT No.: PCT/US2020/056063
§ 371 (c)(1),
(2) Date: Apr. 15, 2022

(87) PCT Pub. No.: WO2021/076950
PCT Pub. Date: Apr. 22, 2021

(65) Prior Publication Data
US 2022/0370018 A1    Nov. 24, 2022

Related U.S. Application Data

(60) Provisional application No. 62/916,007, filed on Oct. 16, 2019.

(51) Int. Cl.
*G06K 9/00*    (2022.01)
*A61B 3/11*    (2006.01)
(Continued)

(52) U.S. Cl.
CPC ............ *A61B 5/7275* (2013.01); *A61B 3/112* (2013.01); *A61B 3/1216* (2013.01); *A61B 3/14* (2013.01);
(Continued)

(58) Field of Classification Search
None
See application file for complete search history.

(56) References Cited

U.S. PATENT DOCUMENTS

2011/0081323 A1* 4/2011 Kleinsek ............... A61P 43/00
514/20.7
2017/0245759 A1 8/2017 Jain et al.
(Continued)

FOREIGN PATENT DOCUMENTS

RU    2549314 C2    4/2015

OTHER PUBLICATIONS

International Search Report and Written Opinion of the International Searching Authority in International Appl. No. PCT/US2020/056063, dated Feb. 4, 2021, 5 pages.

*Primary Examiner* — Wei Wen Yang
(74) *Attorney, Agent, or Firm* — Foley & Lardner LLP (57) ABSTRACT

A computer system for determining onset of an acute coronary syndrome (ACS) event in a remote computing environment comprising one or more processors, one or more computer-readable memories, and one or more computer-readable storage devices, and program instructions stored on at least one of the one or more storage devices for execution by at least one of the one or more processors via at least one of the one or more memories is provided. The stored program instructions include capturing, using a camera, a first image at a first time of an iris and a pupil of a first eye of a user; following the capturing of the first image, identifying in the first image a first iris information; capturing, using the camera, a second image at a second time of the iris and the pupil of the first eye of the user; following the capturing of the second image, identifying in the second image a second iris information; determining whether the first iris information is within an allowable range of the second iris information; and providing an indication of a (Continued)

likely ACS event based on a determination of whether the first iris information is within the allowable range of the second iris information.

8 Claims, 11 Drawing Sheets

(51) Int. Cl.
   *A61B 3/12* (2006.01)
   *A61B 3/14* (2006.01)
   *A61B 5/00* (2006.01)
   *G06T 7/00* (2017.01)
   *G06T 7/62* (2017.01)
   *G06T 7/70* (2017.01)
   *G06T 7/90* (2017.01)

(52) U.S. Cl.
   CPC .............. *G06T 7/0014* (2013.01); *G06T 7/62* (2017.01); *G06T 7/70* (2017.01); *G06T 7/90* (2017.01); *G06T 2207/10024* (2013.01); *G06T 2207/20081* (2013.01); *G06T 2207/20084* (2013.01); *G06T 2207/30041* (2013.01)

(56) References Cited

U.S. PATENT DOCUMENTS

| | | |
|---|---|---|
| 2017/0275619 A1* | 9/2017 | Wang .................. A61K 31/713 |
| 2018/0235464 A1 | 8/2018 | Whang |
| 2019/0104949 A1 | 4/2019 | Cadieu et al. |
| 2021/0004715 A1* | 1/2021 | Neumann ............... G16H 40/63 |
| 2022/0218198 A1* | 7/2022 | Devani ................ A61B 5/4088 |

* cited by examiner

//main.py import numpy as np def sigmoid(x):

# Activation function sigmoid: f (x) = 1 / (1 + e ^ (- x))

return 1 / (1 + np.exp(-x))

def deriv_sigmoid(x):

# Derived from sigmoid: f '(x) = f (x) * (1 - f (x))

fx = sigmoid(x)

return fx * (1 - fx)

def mse_loss(y_true, y_pred):

# y_true and y_pred are numpy arrays with the same length return ((y_true - y_pred) ** 2).mean()

class NeuralNetwork:

"""

- 4 inputs

- hidden layer with 4 neurons (h1, h2, h3, h4)

- output layer with 1 neuron (o1)

"""

def __init__(self):

# weights self.weights = np.random.normal(0, 1, 20)

FIG. 3A

```
biases self.biases = np.random.normal(0, 1, 5)

self.biases[3] = 145 print(self.biases)

def feedforward(self, x):

x is array of numpy with 4 elements h1 = sigmoid(self.weights[0] * x[0] + self.weights[1] * x[1] + self.weights[2] * x[2] + self.weights[3] * x[3] + self.biases[0])

h2 = sigmoid(self.weights[4] * x[0] + self.weights[5] * x[1] + self.weights[6] * x[2] + self.weights[7] * x[3] + self.biases[1])

h3 = sigmoid(self.weights[8] * x[0] + self.weights[9] * x[1] + self.weights[10] * x[2] + self.weights[11] * x[3] + self.biases[2])

h4 = sigmoid(self.weights[12] * x[0] + self.weights[13] * x[1] + self.weights[14] * x[2] + self.weights[15] * x[3] + self.biases[3])

o1 = sigmoid(self.weights[16] * h1 + self.weights[17] * h2 + self.weights[18] * h3 + self.weights[19] * h4 + self.biases[4])

return o1 def train(self, data, all_y_trues):
    """
    - data is a (n x 2) numpy array, n = # of samples in the dataset.
    - all_y_trues is a numpy array with n elements.
      Elements in all_y_trues correspond to those in data.
    """
    learn_rate = 0.1
```

FIG. 3B

```
epochs = 5000  # count of iteration on all dataset for epoch in range(epochs):

for x, y_true in zip(data, all_y_trues):

Perform feedback h1_input = self.weights[0] * x[0] + self.weights[1] * x[1] + self.weights[2] * x[2] + self.weights[3] * x[3] + self.biases[0]

h1_output = sigmoid(h1_input)

h2_input = self.weights[4] * x[0] + self.weights[5] * x[1] + self.weights[6] * x[2] + self.weights[7] * x[3] + self.biases[1]

h2_output = sigmoid(h2_input)

h3_input = self.weights[8] * x[0] + self.weights[9] * x[1] + self.weights[10] * x[2] + self.weights[11] * x[3] + self.biases[2]

h3_output = sigmoid(h3_input)

h4_input = self.weights[12] * x[0] + self.weights[13] * x[1] + self.weights[14] * x[2] + self.weights[15] * x[3] + self.biases[3]

h4_output = sigmoid(h4_input)

o1_input = self.weights[16] * h1_output + self.weights[17] * h2_output + self.weights[18] * h3_output + self.weights[19] * h4_output + self.biases[4]

o1_output = sigmoid(o1_input)

y_pred = o1_output

# --- Counting partial derivatives
```

FIG. 3C

--- Name: d_L_d_w1 === "part L / part w1"

d_L_d_ypred = -2 * (y_true - y_pred)

Neuron o1 d_ypred_d_w16 = h1_output * deriv_sigmoid(o1_input)     d_ypred_d_w17 = h2_output * deriv_sigmoid(o1_input)     d_ypred_d_w18 = h3_output * deriv_sigmoid(o1_input)     d_ypred_d_w19 = h4_output * deriv_sigmoid(o1_input)     d_ypred_d_b4 = deriv_sigmoid(o1_input)

d_ypred_d_h1 = self.weights[16] * deriv_sigmoid(o1_input)     d_ypred_d_h2 = self.weights[17] * deriv_sigmoid(o1_input)     d_ypred_d_h3 = self.weights[18] * deriv_sigmoid(o1_input)     d_ypred_d_h4 = self.weights[19] * deriv_sigmoid(o1_input)

Neuron h1 d_h1_d_w0 = x[0] * deriv_sigmoid(h1_input)     d_h1_d_w1 = x[1] * deriv_sigmoid(h1_input)     d_h1_d_w2 = x[2] * deriv_sigmoid(h1_input)     d_h1_d_w3 = x[3] * deriv_sigmoid(h1_input)     d_h1_d_b0 = deriv_sigmoid(h1_input)

Neuron h2 d_h2_d_w4 = x[0] * deriv_sigmoid(h2_input)     d_h2_d_w5 = x[1] * deriv_sigmoid(h2_input)     d_h2_d_w6 = x[2] * deriv_sigmoid(h2_input)     d_h2_d_w7 = x[3] * deriv_sigmoid(h2_input)     d_h2_d_b1 = deriv_sigmoid(h2_input)

Neuron h3 d_h3_d_w8 = x[0] * deriv_sigmoid(h3_input)

FIG. 3D d_h3_d_w9 = x[1] * deriv_sigmoid(h3_input)          d_h3_d_w10 = x[2] * deriv_sigmoid(h3_input)          d_h3_d_w11 = x[3] * deriv_sigmoid(h3_input)

d_h3_d_b2 = deriv_sigmoid(h3_input)

Neuron h4 d_h4_d_w12 = x[0] * deriv_sigmoid(h4_input)          d_h4_d_w13 = x[1] * deriv_sigmoid(h4_input)          d_h4_d_w14 = x[2] * deriv_sigmoid(h4_input)

d_h4_d_w15 = x[3] * deriv_sigmoid(h4_input)

d_h4_d_b3 = deriv_sigmoid(h4_input)

--- Updating the weight and biases

Neuron h1 self.weights[0] -= learn_rate * d_L_d_ypred * d_ypred_d_h1 * d_h1_d_w0 self.weights[1] -= learn_rate * d_L_d_ypred * d_ypred_d_h1 * d_h1_d_w1 self.weights[2] -= learn_rate * d_L_d_ypred * d_ypred_d_h1 * d_h1_d_w2 self.weights[3] -= learn_rate * d_L_d_ypred * d_ypred_d_h1 * d_h1_d_w3 self.biases[0] -= learn_rate * d_L_d_ypred * d_ypred_d_h1 * d_h1_d_b0

Neuron h2 self.weights[4] -= learn_rate * d_L_d_ypred * d_ypred_d_h2 * d_h2_d_w4 self.weights[5] -= learn_rate * d_L_d_ypred * d_ypred_d_h2 * d_h2_d_w5 self.weights[6] -= learn_rate * d_L_d_ypred * d_ypred_d_h2 * d_h2_d_w6 self.weights[7] -= learn_rate * d_L_d_ypred * d_ypred_d_h2 * d_h2_d_w7 self.biases[1] -= learn_rate * d_L_d_ypred * d_ypred_d_h2 * d_h2_d_b1

Neuron h3 self.weights[8] -= learn_rate * d_L_d_ypred * d_ypred_d_h3 * d_h3_d_w8 self.weights[9] -= learn_rate * d_L_d_ypred * d_ypred_d_h3 * d_h3_d_w9

FIG. 3E

```
self.weights[10] -= learn_rate * d_L_d_ypred * d_ypred_d_h3 * d_h3_d_w10
self.weights[11] -= learn_rate * d_L_d_ypred * d_ypred_d_h3 * d_h3_d_w11
self.biases[2] -= learn_rate * d_L_d_ypred * d_ypred_d_h3 * d_h3_d_b2

# Neuron h4
self.weights[12] -= learn_rate * d_L_d_ypred * d_ypred_d_h4 * d_h4_d_w12
self.weights[13] -= learn_rate * d_L_d_ypred * d_ypred_d_h4 * d_h4_d_w13
self.weights[14] -= learn_rate * d_L_d_ypred * d_ypred_d_h4 * d_h4_d_w14
self.weights[15] -= learn_rate * d_L_d_ypred * d_ypred_d_h4 * d_h4_d_w15
self.biases[3] -= learn_rate * d_L_d_ypred * d_ypred_d_h4 * d_h4_d_b3

# Neuron o1
self.weights[16] -= learn_rate * d_L_d_ypred * d_ypred_d_w16
self.weights[17] -= learn_rate * d_L_d_ypred * d_ypred_d_w17
self.weights[18] -= learn_rate * d_L_d_ypred * d_ypred_d_w18
self.weights[19] -= learn_rate * d_L_d_ypred * d_ypred_d_w19
self.biases[4] -= learn_rate * d_L_d_ypred * d_ypred_d_b4

# --- Calculate the total loss at the end of each phase
if epoch % 10 == 0:
    y_preds = np.apply_along_axis(self.feedforward, 1, data)
    loss = mse_loss(all_y_trues, y_preds)
    print("Epoch %d loss: %.3f" % (epoch, loss))

# Defining a dataset
data = np.array([
    [1, 4, 10, -5],   #1
```

all_y_trues = np.array([1, 0, 0, 0, 0, 0, 0, 0, 0, 0, 1, 1, 1, 1, 1, 1])

network = NeuralNetwork()

network.train(data, all_y_trues)

Making predictions case3 = np.array([3, 5, 12, -3])

print("Case 3: %.3f" % network.feedforward(case3))

Run application

Arguments in the array: 1) iris color (1 – green, 2 – blue, 3 – grey, 4 – black), 2) iris size, 3) pupil size, 4) heart rate (bias is 145 bpm)

1) Case 1: [3, 5, 12, -3] ; Risk 98.2%

```
Epoch 0 loss: 0.240
Epoch 1000 loss: 0.229
Epoch 2000 loss: 0.229
Epoch 3000 loss: 0.229
Epoch 4000 loss: 0.229

Case 1: 0.982   #98.2%
```

2) Case 2: [3, 4, 12, -61] ; Risk 48.3%

```
Epoch 0 loss: 0.305
Epoch 1000 loss: 0.232
Epoch 2000 loss: 0.232
Epoch 3000 loss: 0.232
Epoch 4000 loss: 0.232

Case 2: 0.483   #48.3%
```

FIG. 3I

SYSTEM, APPARATUS, AND METHOD FOR PREDICTING ACUTE CORONARY SYNDROME VIA IMAGE RECOGNITION

PRIORITY

The present application claims priority to U.S. Provisional Patent Application No. 62/916,007 which was filed in the United States Patent and Trademark Office on Oct. 16, 2019, the entire disclosure of which is incorporated herein by reference.

INTRODUCTION

Embodiments of the invention relate generally to an apparatus for predicting acute coronary syndrome ("ACS") via image recognition/computer vision software. The apparatus may include software applications that running on an electronic device, including a smartphone, tablet, or the like.

Cardiac diseases, and in particular ACS, are often an indicator of severe damage in the heart muscle, and carry a substantial risk to an individual, including death. ACS is a type of coronary heart disease and may be caused by a myocardial infarction (sometimes referred to as a heart attack), or may put individuals at greater risk for myocardial infarctions in the future. That is, acute coronary syndrome may take the form of a myocardial infarction.

More specifically, ACS refers to a group of conditions including ST-elevation myocardial infarction (STEMI), non-ST elevation myocardial infarction (NSTEMI), and unstable angina pectoris (unstable angina). A myocardial infarction occurs when blood flow to the heart stops or decreases. A myocardial infarction may cause an irregular heartbeat, cardiogenic shock, heart failure, or cardiac arrest.

Risk factors for ACS may include poor diet, lack of exercise, smoking, drug use, high cholesterol, hypertension, male sex, family obesity, diabetes. Symptoms of ACS may include substernal chest pain, sometimes described as crushing or pressure-like, radiating to the patient's jaw and/or left arm or shoulder.

ACS is often the result of plaque disruption (i.e., a plaque blockage) in coronary arteries (referred to as atherosclerosis).

Prediction of future cardiac events, such as ACS and myocardial infarctions, involves substantial guess-work. While there are clear risk factors that place individuals at increased risk for future cardiac events such as smoking and obesity, determining and quantifying the risk, and predicting specific periods of the risk for a particular patient, has proven elusive and difficult.

It would be desirable, therefore, to provide apparatuses, systems and methods for diagnosing cardiac event risk based on non-invasive and/or digital methods, without the need for specialized devices that may not be available to some patients.

It would be further desirable to provide apparatuses, systems and methods for alerting individuals to an increased likelihood of substantial risks of ACS, and providing remediation opportunities to such individuals.

While the invention is described with reference to the above drawings, the drawings are intended to be illustrative, and the invention contemplates other embodiments within the spirit of the invention.

DETAILED DESCRIPTION OF EMBODIMENTS OF THE PRESENT INVENTION

The present invention will now be described more fully hereinafter with reference to the accompanying drawings which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as devices or methods. Accordingly, the present invention may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrases "in one embodiment," "in an embodiment," and the like, as used herein, does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" includes plural references. The meaning of "in" includes "in" and "on."

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Figure 1:
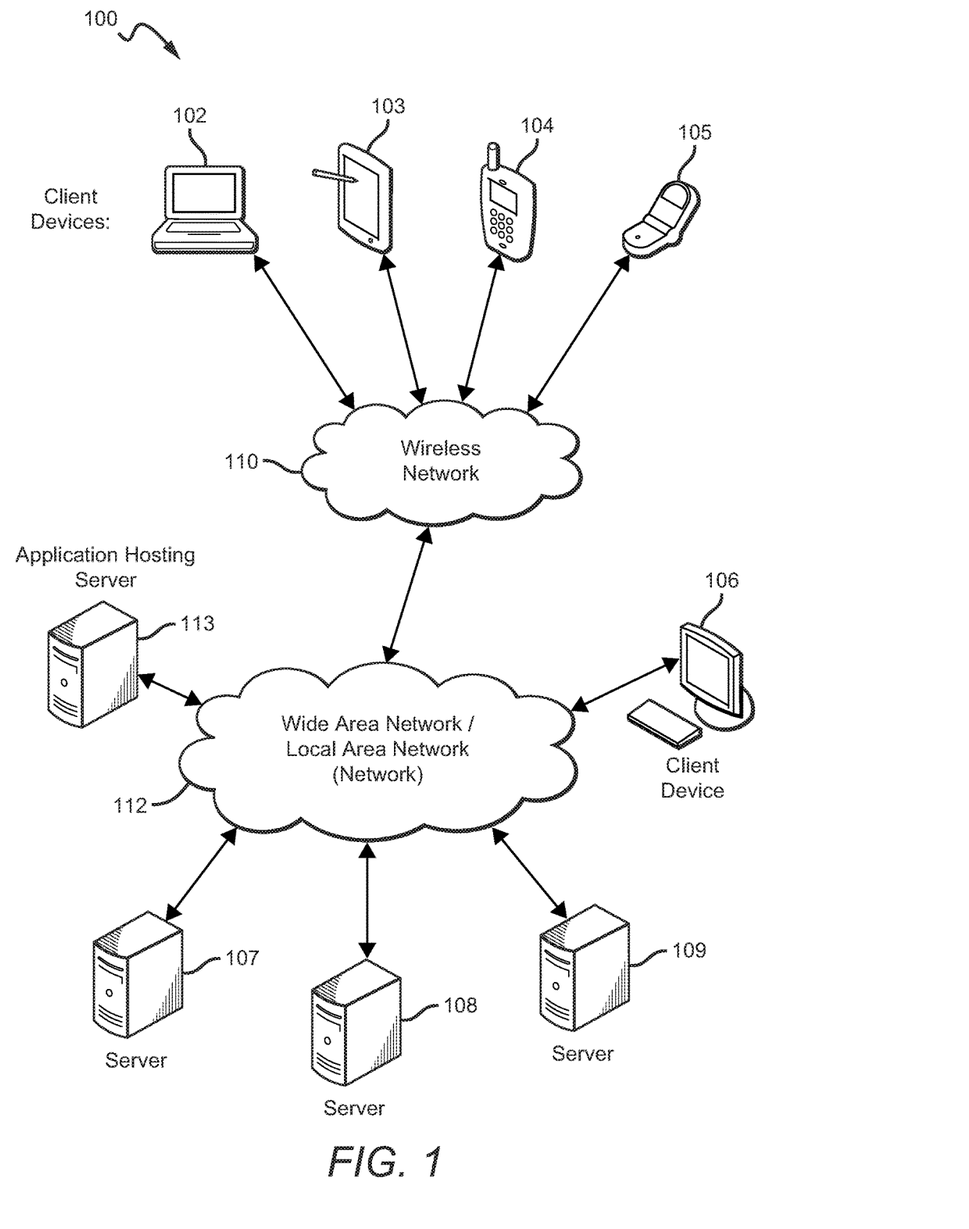
FIG. 1 illustrates a block diagram of a distributed computer system that can implement one or more aspects of an embodiment of the present invention.

FIG. 1 illustrates components of one embodiment of an environment in which the invention may be practiced. Not all of the components may be required to practice the invention, and variations in the arrangement and type of the components may be made without departing from the spirit or scope of the invention. As shown, the system 100 includes one or more Local Area Networks ("LANs")/Wide Area Networks ("WANs") 112, one or more wireless networks 110, one or more wired or wireless client devices 106, mobile or other wireless client devices 102-105, servers 107-109, and may include or communicate with one or more data stores or databases. Various of the client devices 102-106 may include, for example, desktop computers, laptop computers, set top boxes, tablets, cell phones, smart phones, smart speakers, wearable devices (such as the Apple Watch) and the like. The servers 107-109 can include, for example, one or more application servers, content servers, search servers, and the like. FIG. 1 also illustrates application hosting server 113.

Figure 2:
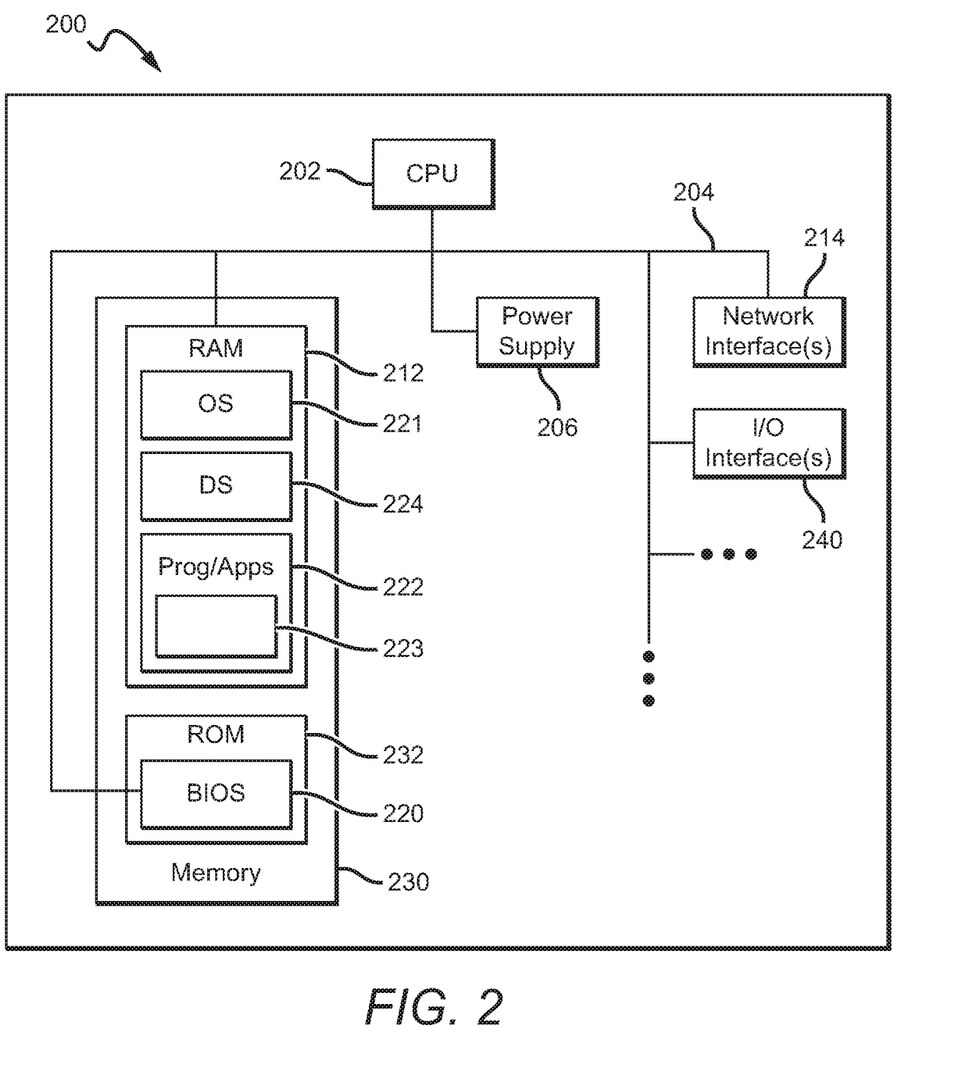
FIG. 2 illustrates a block diagram of an electronic device that can implement one or more aspects of an embodiment of the invention.

FIG. 2 illustrates a block diagram of an electronic device 200 that can implement one or more aspects of the apparatus for determining mobile application user engagement (the "Engine") according to one embodiment of the invention. Instances of the electronic device 200 may include servers, e.g., servers 107-109, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, microscopes, GPS components, cameras, heart rate sensors, light sensors, accelerometers, targeted biometric sensors, etc., which may be operable, for example, to provide graphical user interfaces or text user interfaces.

A user may provide input via a touchscreen of an electronic device 200. A touchscreen may determine whether a user is providing input by, for example, determining whether the user is touching the touchscreen with a part of the user's body such as his or her fingers. The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software-controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the program 223. The ROM 232 can also include Basic Input/Output System (BIOS) 220 of the electronic device.

Software aspects of the program 223 are intended to broadly include or represent all programming, applications, algorithms, models, software and other tools necessary to implement or facilitate methods and systems according to embodiments of the invention. The elements may exist on a single computer or be distributed among multiple computers, servers, devices or entities.

The power supply 206 contains one or more power components, and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the Engine, via a network to another device. Also, an application server may, for example, host a web site that can provide a user interface for administration of example aspects of the Engine.

Any computing device capable of sending, receiving, and processing data over a wired and/or a wireless network may act as a server, such as in facilitating aspects of implementations of the Engine. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example apparatus, system and method of the Engine. One or more servers may, for example, be used in hosting a Web site, such as the web site www.microsoft.com. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for the apparatus, system and method embodying the Engine. Content may include, for example, text, images, audio, video, and the like.

In example aspects of the apparatus, system and method embodying the Engine, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers such as the Apple Watch and Fitbit, integrated devices combining one or more of the preceding devices, and the like.

Client devices such as client devices 102-106, as may be used in an example apparatus, system and method embodying the Engine, may range widely in terms of capabilities and features. For example, a cell phone, smart phone or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, respiration sensors, body movement sensors, proximity sensors, motion sensors, ambient light sensors, moisture sensors, temperature sensors, compass, barometer, fingerprint sensor, face identification sensor using the camera, pulse sensors, heart rate variability (HRV) sensors, beats per minute (BPM) heart rate sensors, microphones (sound sensors), speakers, GPS or other location-aware capability, and a 2D or 3D touch-sensitive color screen on which both text and graphics may be displayed. In some embodiments multiple client devices may be used to collect a combination of data. For example, a smart phone may be used to collect movement data via an accelerometer and/or gyroscope and a smart watch (such as the Apple Watch) may be used to collect heart rate data. The multiple client devices (such as a smart phone and a smart watch) may be communicatively coupled.

Client devices, such as client devices 102-106, for example, as may be used in an example apparatus, system and method implementing the Engine, may run a variety of operating systems, including personal computer operating systems such as Windows, iOS or Linux, and mobile operating systems such as iOS, Android, Windows Mobile, and the like. Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MMS, playing games (such as fantasy sports leagues), receiving advertising, watching locally stored or streamed video, or participating in social networks.

In example aspects of the apparatus, system and method implementing the Engine, one or more networks, such as networks 110 or 112, for example, may couple servers and client devices with other computing devices, including through wireless network to client devices. A network may be enabled to employ any form of computer readable media for communicating information from one electronic device to another. The computer readable media may be non-transitory. A network may include the Internet in addition to Local Area Networks (LANs), Wide Area Networks (WANs), direct connections, such as through a Universal Serial Bus (USB) port, other forms of computer-readable media (computer-readable memories), or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art. Furthermore, remote computers and other related electronic devices could be remotely connected to either LANs or WANs via a modem and a telephone link.

A wireless network, such as wireless network 110, as in an example apparatus, system and method implementing the Engine, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPV6. The Internet includes local area networks (LANs), Wide Area Networks (WANs), wireless networks, and long-haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A "content delivery network" or "content distribution network" (CDN), as may be used in an example apparatus, system and method implementing the Engine, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's web site infrastructure, in whole or in part, on the third party's behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Embodiments of the present invention include apparatuses, systems, and methods implementing the Engine. Embodiments of the present invention may be implemented on one or more of client devices 102-106, which are communicatively coupled to servers including servers 107-109. Moreover, client devices 102-106 may be communicatively (wirelessly or wired) coupled to one another. In particular, software aspects of the above may be implemented in the program 223. The program 223 may be implemented on one or more client devices 102-106, one or more servers 107-109, and 113, or a combination of one or more client devices 102-106, and one or more servers 107-109 and 113.

As noted above, embodiments of the present invention relate to apparatuses, methods and systems of predicting/determining the likelihood of ACS via image recognition/computer vision software running on an electronic device. The embodiments may be referred as the digital eye index (DEI) system, DEI apparatus, and/or DEI method.

In one embodiment, the DEI system may include image recognition/computer vision software running on a smartphone of a user, a DEI apparatus.

The camera of the electronic device, the DEI apparatus, may capture one or more photographs and/or videos of, for example, a user's eye or eyes to make certain predictions regarding the likelihood of ACS, as discussed in more detail below.

In one embodiment, the photographs may be taken immediately in response to the user activating a camera of the electronic device and taking a picture or video of his or her eye or eyes.

In another embodiment, software including image recognition/computer vision algorithms may run in the background activating the camera at regular intervals to first determine whether the eyes of a person are present within the field of the camera. Such determination may be made, for example, by detecting the presence of a user's eyes and determining the interpupillary distance between the pupils of the eyes of the user. Once an interpupillary distance determination is made, the software may access a database (which may be stored on the electronic device or communicatively coupled to the electronic device) mapping interpupillary distances to human age ranges and confirm that the interpupillary distance matches the age of the user or a broad range of users (e.g., adults).

If the electronic device determines that the image captured by the camera includes the eyes of a person, it further determines certain characteristics of the eyes (which may be in conjunction with other data such as biometric data) to determine the likelihood of ACS, as discussed in further detail below.

More specifically, in accordance with an embodiment, a novel DEI monitoring and assessment apparatus, method and system are provided. The DEI system may be implemented in software running on a smartphone. The DEI system may include a cumulative measure of cardiovascular risk. For example, the DEI system may measure cardiovascular risk in individuals with ACS or determine whether an individual is afflicted with ACS.

In one embodiment, the DEI will analyze the responsiveness of a human eye of a user to certain cardiac features, due to a system of shared nerves. That is, the two branches of the Autonomic Nervous System (ANS), the sympathetic nervous system and the parasympathetic nervous system, control both the dilation/constriction of the pupil and the increase or decrease of the heart rate of an individual.

In an embodiment, upon determining that one or more eyes are present within the range of the camera of an electronic device, the DEI analyzes a change in iris diameter of an eye of a user. The change may be analyzed in response to activation of the ANS. For example, the DEI system may determine that the ANS has been activated.

The activation of the ANS may be determined via determining specific heart rates, and indicating whether the parasympathetic or sympathetic nervous systems have been activated. In particular, the electronic device may include or be communicatively coupled to one or more wearables that include certain sensors capable of detecting various biometric data such as heart rate (using, for example, an electrocardiogram (ECG) or heart rate variability (HRV) sensor).

Based on the detection of, for example, an increased or increasing heart rate via the ECG or HRV sensors/monitors, the system may take one or more photographs of the user to determine whether the iris diameter of the user has changed in response to activation of the ANS. That is, a change in the iris diameter may reflect a change in HRV. And a change in HRV may be used to predict the onset of an ACS event. Therefore, a change in iris diameter detected by the system may be used to predict the onset of an ACS event.

For example, the system may determine whether a particular percent or absolute change (e.g., in millimeters) in iris diameter warrants a determination of the onset of an ACS event. The determination of whether a particular change of an iris event warrants a determination of the onset of an ACS event may also be based on: (1) the history of ACS events; (2) a patient's health history; (3) results of the patient's genetic testing; (2) a history of the patient's family's health history; and/or (4) the physical activity of the user as determined by the electronic device and/or the wearables.

In a further embodiment, the DEI system monitors changes in iris color or composition. For example, a camera is used to determine a first iris color at a first point in time. The camera is then used to determine a second iris color at a second point in time. The two points in time may be consecutive measurements or non-consecutive measurements. The color of the iris may be identical at the two points in time, or may be of a different color saturation (for example, different brown saturations at both points in time). The DEI system may compare differences in iris color between the first iris color and the second iris color. The DEI system may also take more than two images to determine an ongoing trend in color change. That is, the DEI system may compare differences at more than two points in time (for example, 3, 4, 10, or 100 points in time). For example, the DEI system may take an image of the eye every minute in the background while a user's eye is visible to the lens of the camera and constantly evaluate any changes/trends in the color of the iris. For example, although the difference between the color of an iris may be minimal at two close points in time (e.g., taken one minute or one hour apart), longer term trends such as color changes over a period of weeks, months, or years may show a change in iris color.

In another embodiment, the DEI system may compare not only trends in color change of a particular user's iris color at two consecutive points in time, or various points in time, but also compare a user's iris color/trends in iris color to the iris color of healthy users, as well as users with ACS. For example, the DEI system may include or be communicatively coupled to a neural network such a convolutional neural network, which may be trained on a plurality of images showing a plurality of irises of healthy users ("healthy iris images") and a plurality of images showing a plurality of irises of users afflicted with ACS ("ACS iris images").

The neural network may be trained with, for example, 10,000 healthy iris images and 10,000 ACS iris images. The neural network then learns the relevant features/parameters to determine what is a healthy iris and what is an ACS iris.

In another embodiment, the system may be trained on other data sets. For example, healthy irises of a particular age, and/or sex, and/or ethnicity. For example, the neural network may be trained on, for example, 10,000 healthy irises of 18-30 year old males and 10,000 ACS irises of 18-30 year old males.

Once the neural network has been trained on one or more sets of training data, discussed above, one or more photographic images of a user's iris are provided to the trained neural network, which determines (optionally considering a user's demographic information, health history, exercise history, genetic information, and the like) whether a user is likely to be suffering from ACS now or in the future.

In addition to a change in iris color, the iris composition may also be trained and used as an input.

The change in iris color or composition may be used to indicate cholesterol accumulation around the cornea, and specifically, the corneal arcus. For example, once the amount of cholesterol is above a particular threshold, a gold ring is visible on or near the corneal arcus. In one embodiment, either a video recording or a plurality of digital images may be used to capture dynamic changes and time delays between iris captures.

As discussed above, the eye and heart share a common pathway, the ANS, which regulates their functions. Specifically, the parasympathetic nervous system and sympathetic nervous system work together and, in response to specific stimuli, either: (1) there is an increase of heart rate and iris diameter (sympathetic); or (2) there is a decrease of heart rate and constriction of the pupil (parasympathetic).

The stress response of an individual may be activated when a stimulus is perceived, and determined to be potentially dangerous. This triggers a sympathetic activation (i.e., an activation of the sympathetic nervous system), which causes an increase in heart rate and pupil dilation. Therefore, the interaction between the eye and the heart (e.g., the pupil dilating and the heart rate increasing) is an efficient approximator of heart activity.

In an embodiment, cognitive tasks may be used to create a digital eye index for cognitive difficulties. For example, after a cardiac event, cognitive difficulties may be determined as present. In a further example, verbal memory and executive functions may be assessed after a cardiac event. Based on the presence of cognitive difficulties, a digital eye index may be created. Thus, after a cardiac event, the DEI system regularly captures images of a user's iris and determines the diameter of the iris as well as information regarding a user's heart rate such by ECG or HRV.

Heart rate variability (HRV), a natural variation occurring in the beat-to-beat interval in a specified time frame, may be used as a predictor of cardiovascular outcomes. Thus, HRV may be used to predict future cardiac events. In an embodiment, HRV may be an indicator of dysregulation of the autonomic nervous system, and a predictor of future mortality and cardiac events.

It may, however, be difficult to effectively measure and assess HRV in order to predict future outcomes. In an embodiment, in order to predict the likelihood of a future cardiac event, a correlation between HRV and iris diameter may be established. In a further example, a plurality of images of an iris diameter may be captured by a camera in an electronic device, and compared to HRV at the time each of the plurality of images was captured to establish a correlation.

In an illustrative process, the steps performed by the DEI system may include: (1) capturing (by, for example, a camera on a smartphone) a first image at a first time of an eye of a user including an iris and a pupil; (2) following the capturing of the first image, analyzing the first image via image recognition/computer vision and identifying, in the first image, iris information including a specific location of the iris relative to the pupil, and/or a first color indicator of the iris; (3) capturing a second image of the iris at a second time; (4) identifying, in the second image, a specific location of the iris relative to the pupil, or a second color indicator of the iris; (5) determining whether the location of the iris in the second image is within a predetermined allowable range relative to the location of the iris in the first image; (6) determining whether the second color of the iris in the second image is within a predetermined allowable range relative to the first color of the iris in the first image; (7) providing an indication of whether or not HRV beyond a predetermined threshold is present, and whether a future cardiac event is predicted to occur (for example, data including images and/or videos including iris location and/or iris color of a plurality of individuals at a plurality of time points is collected and stored in database; data regarding HRV of the individuals at the plurality of time points is collected and stored in database; data regarding cardiac events of the individuals is collected and stored in database; using machine learning, determination is made using input from new patient, including plurality of iris images, HRV data, and/or past cardiac events to determine likelihood of future cardiac event); (8) providing an estimated time frame for occurrence of the future cardiac event (for example, similar to (7), using machine learning, determination is made as to estimated time frame for occurrence of future cardiac event).

Regarding step (2) above, the distance between the iris relative to the pupil may be calculated using a three-dimensional Cartesian coordinate system. If the center of the iris is at point $X_1, Y_1, Z_1$ and the center of the pupil is at point $X_2, Y_2, Z_2$, then the distance between the center of the iris and the center of the pupil is the square root of $((X_2-X_1)^2+(Y_2-Y_1)^2+(Z_2-Z_1)^2)$.

Therefore, in an embodiment, the changes in iris composition and/or iris color can be used to determine and analyze risk factors in cardiovascular health. In one instance, if the DEI system detects a white/yellowish ring at the outer edges of the cornea (corneal arcus), the DEI system makes a determination of hypercholesterolemia. The individual utilizing the camera is then flagged for increased cardiovascular risk and may be notified of such risk by being presented a message on a screen of an electronic device. That is, due to the accumulation of lipids within the stroma of the eye, the individual is flagged as being likely to experience a future cardiac event.

In a further embodiment, minute changes in pupil size. As discussed above with respect to neural networks, machine learning may be used to identify differences in pupil size and link the differences to alterations in HRV at rest. For example, during an emotional task, machine learning is used to identify differences in the pupil size, and link the differences to changes in HRV, creating a cumulative index. The index is then used to predict future cardiac events.

Constriction and dilation of the pupil, and increase and decrease of the heart rate, are controlled by the ANS. Therefore, the system may monitor constriction and dilation of the pupil via a camera capturing images at regular intervals (or while the device is being used by a user), and may use a heart sensor to monitor an increase/decrease of the heart rate. If a dysregulation, such as excessive pupil constriction or dilation, or excessive heart rate increase or decrease occurs, the DEI system may initiate a pupil response, using the following steps: (1) Fixation task-baseline status; (2) light reflex-eliciting changes in iris diameter not due to the activation of the ANS; and (3) showing emotional videos to evaluate changes due to ANS activation.

In further detail, different eye movements, caused by different environmental and physiological conditions/causes, influence pupil size differently via parasympathetic and sympathetic activity pathway.

Regular eye movement alternates between saccades (the quick, simultaneous movement of both eyes between two or more phases of fixation in the same direction) and visual fixations. Fixation is the maintaining of the visual gaze on a single location. Since pupil size can fluctuate markedly from moment to moment, estimating a baseline performance is difficult, because many eye-tracking measures cannot be compared to a theoretical "true" value. Hence, standard calibration methods rely on individuals fixating visual stimuli, typically dots.

The pupillary light reflex is a reflex that controls the diameter of the pupil, in response to the intensity of light. A greater intensity of light causes the pupil to constrict, whereas a lower intensity of light causes the pupil to dilate (a widening of the pupil). In addition, light shone into one eye will cause both pupils to constrict.

Pupillary light reflex and heart rate variability (HRV) are not correlated, suggesting that the pupillary light reflex involves a different or complementary pathway of the overall autonomic nervous system.

Moreover, changes in physiological arousal are commonly linked to changes of the sympathetic and parasympathetic activity in the autonomic nervous system. Emotional stimuli may be used to evoke emotional arousal. Considering the common sympathetic and parasympathetic control of HRV and pupil size, the activation of the sympathetic system, through emotional stimuli, increases HRV and pupil size, and the activation of the parasympathetic system decreases HRV and pupil size, making possible to evaluate correlations between pupil size and HRV and associate specific pupil changes with cardiovascular outcomes.

Thus, considering the above, the DEI system: (1) compares (within and between individuals) a baseline status of pupil size; (2) determines changes in pupil size due to light reflex (i.e., not involving HRV) and; (3) determines changes in pupil size through emotional stimuli that involve HRV. Thus, changes that correlate with HRV and are different from the baseline and changes due to reflex will be those that will be part of the index to predict future cardiovascular events.

Thus, the DEI system will show emotional videos and/or pictures to users to elicit emotions from such users in order to activate the ANS.

FIGS. 3A-3G show source code that can implement one or more aspects of an embodiment of the present invention. FIGS. 3A-3G include: (1) a first algorithm, which is a training algorithm for a neural network to determine a subject's health, and whether they are in danger of a cardiovascular event (such as ACS), by analyzing changes in eye quality as follows: (a) training input includes a plurality of images of individuals with healthy eyes and a plurality of images of the same individuals except with unhealthy eyes; and (b) hyperparameters including the color and diameter of the irises, size of the pupil, heart-rate, whether the individual has suffered a cardiovascular event and how soon it occurred after the photographs were taken; (2) a second algorithm for determining occurrence of a cardiovascular event that (a) captures a photograph of a subject using the subject's phone, (b) confirms that the photograph is of the primary subject and not some other person, (c) captures the subject's heart rate via a smart watch or other wearable heart rate monitor, (d) enters the eye specimens into the neural network to determine whether the user is at risk for a cardiovascular event, and (e) predict when a cardiovascular event will occur.

Figure 3A:
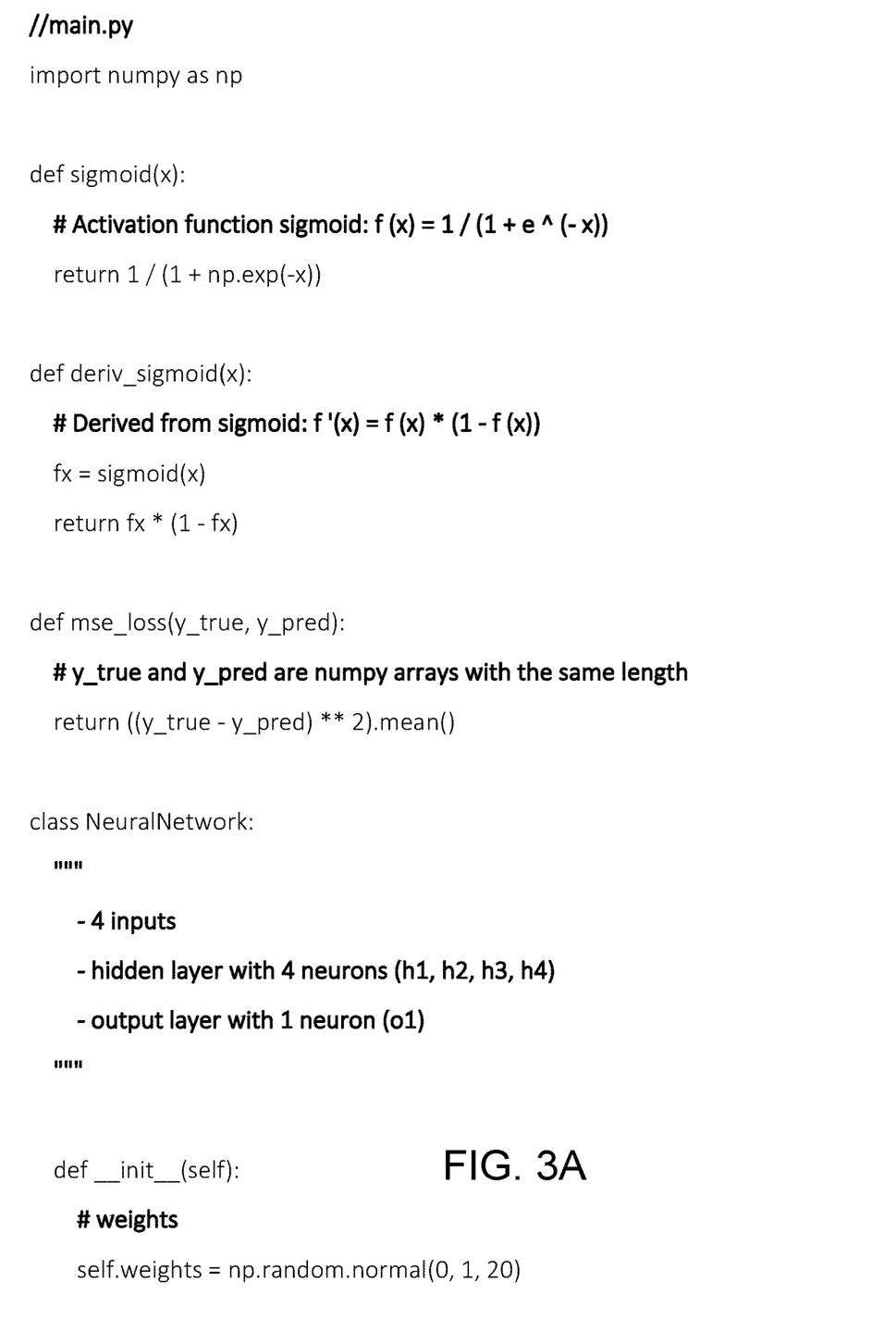
FIGS. 3A-3G show source code that can implement one or more aspects of an embodiment of the present invention.
Figure 3B:
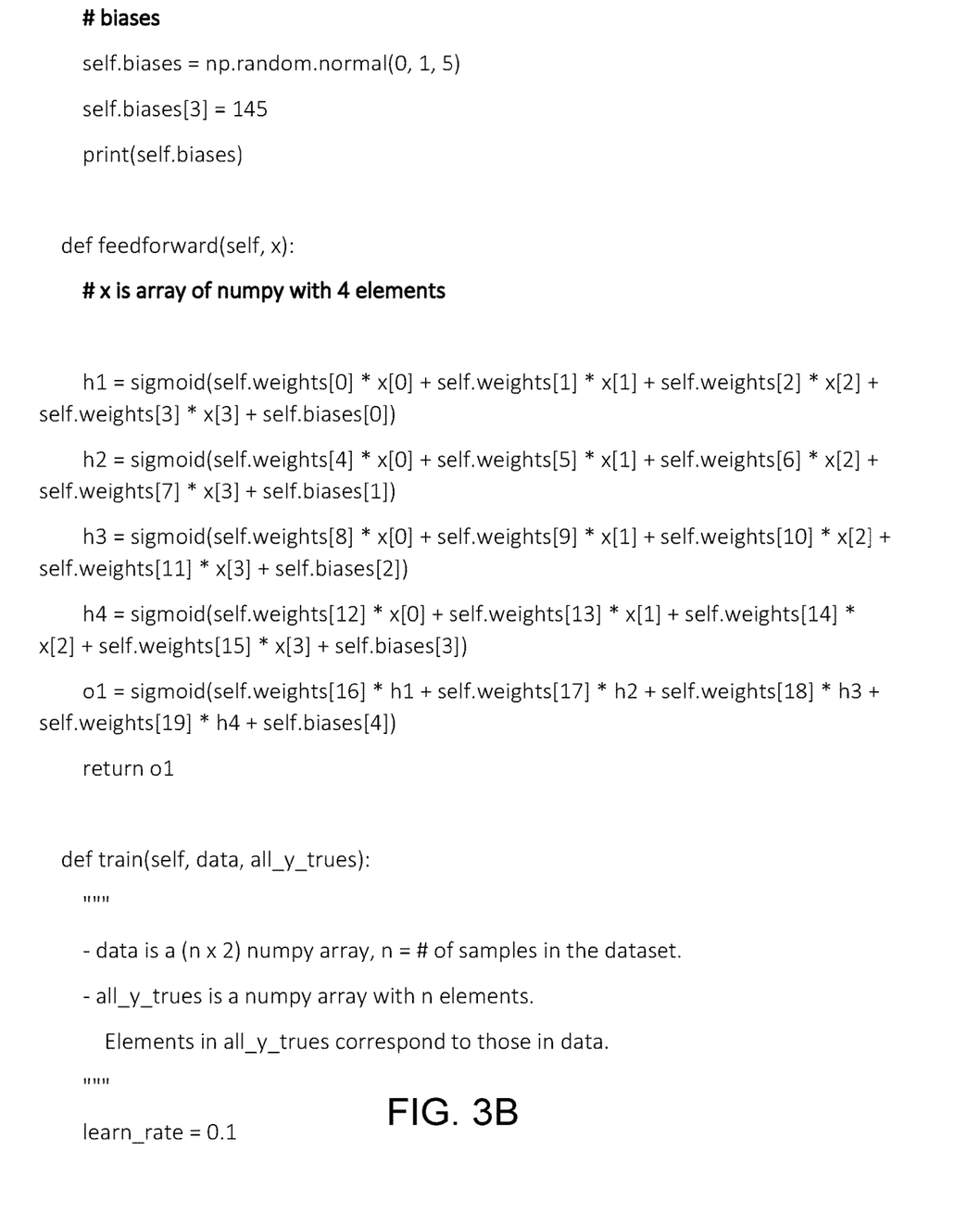
Figure 3C:
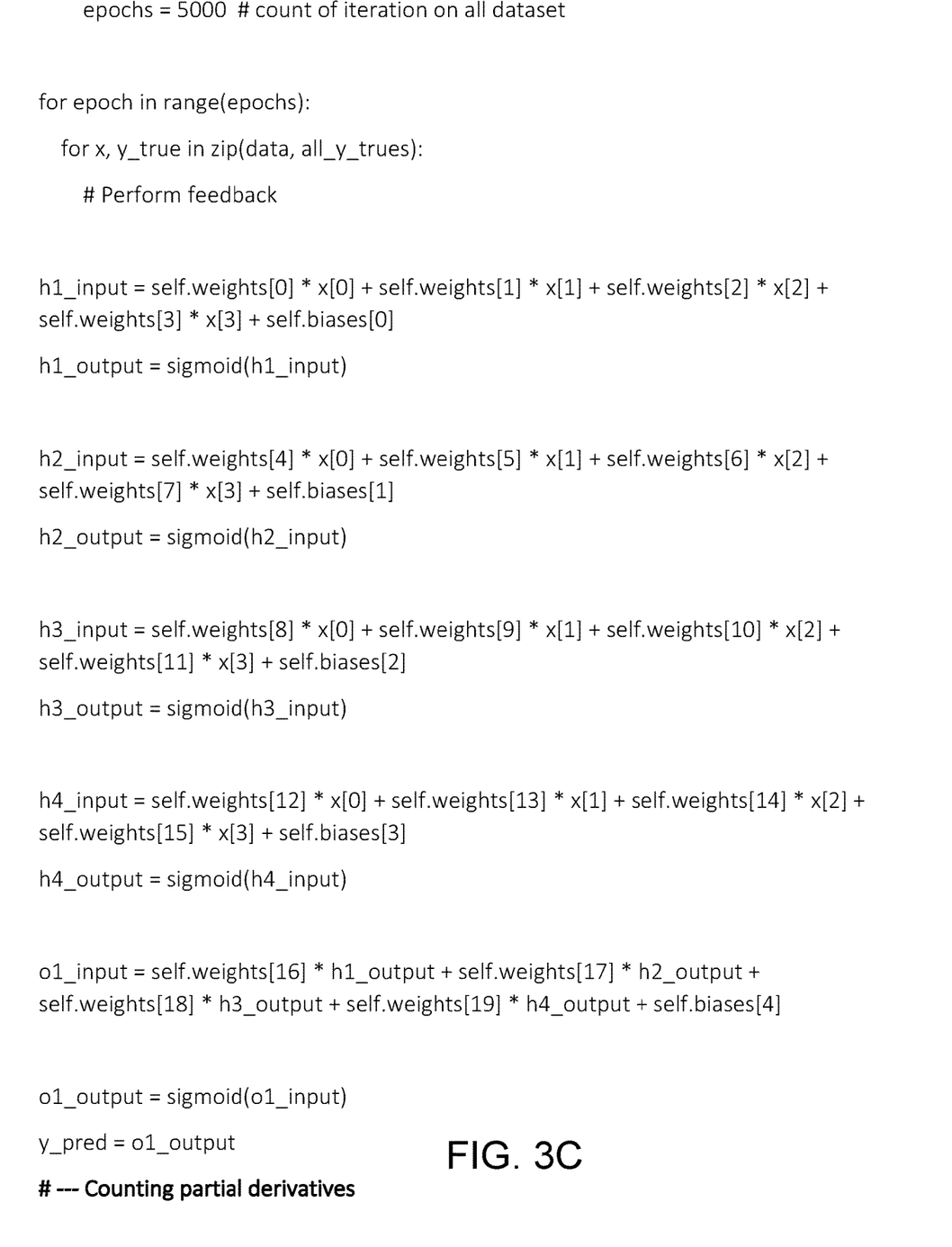
Figure 3D:
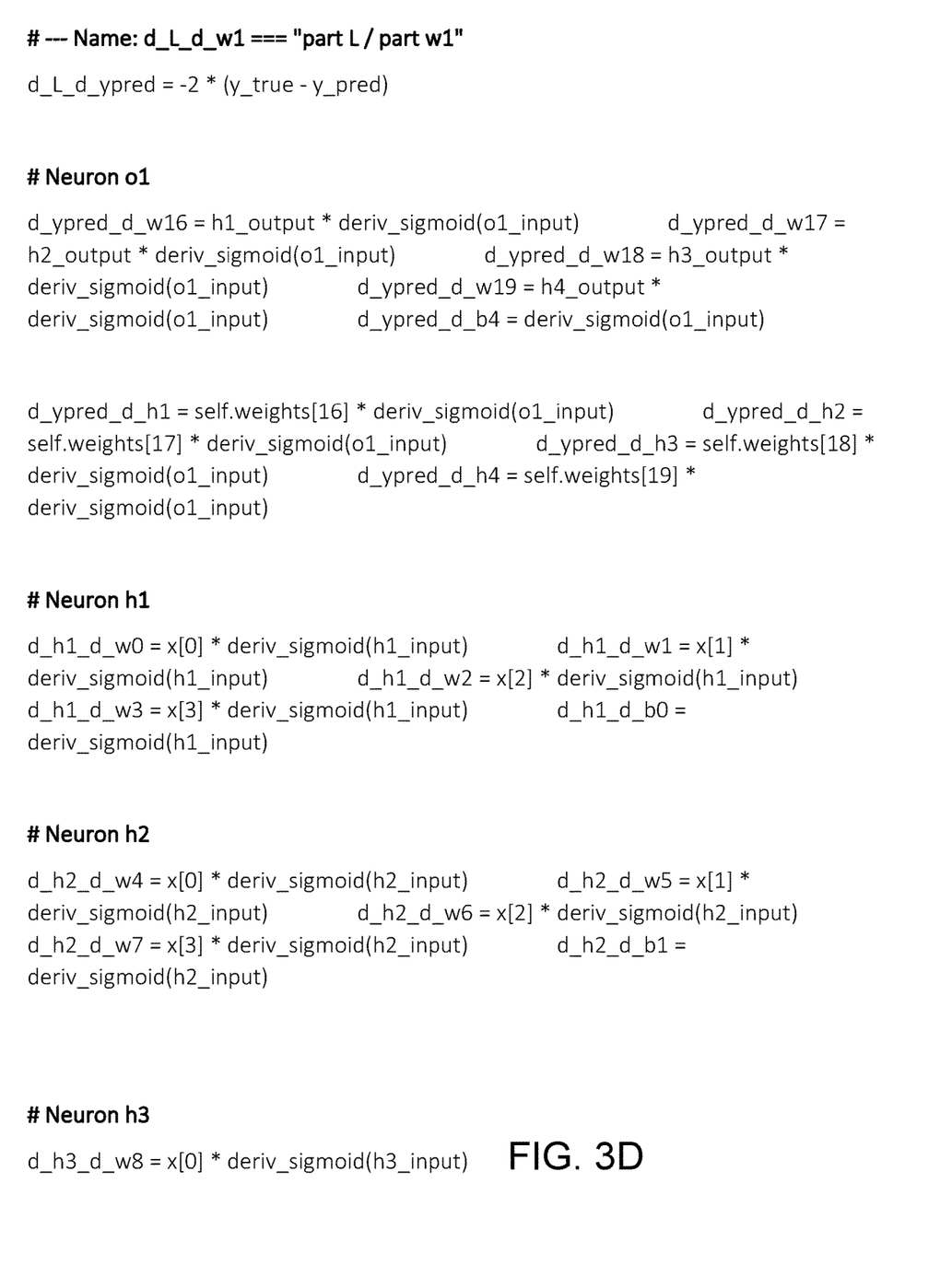
Figure 3E:
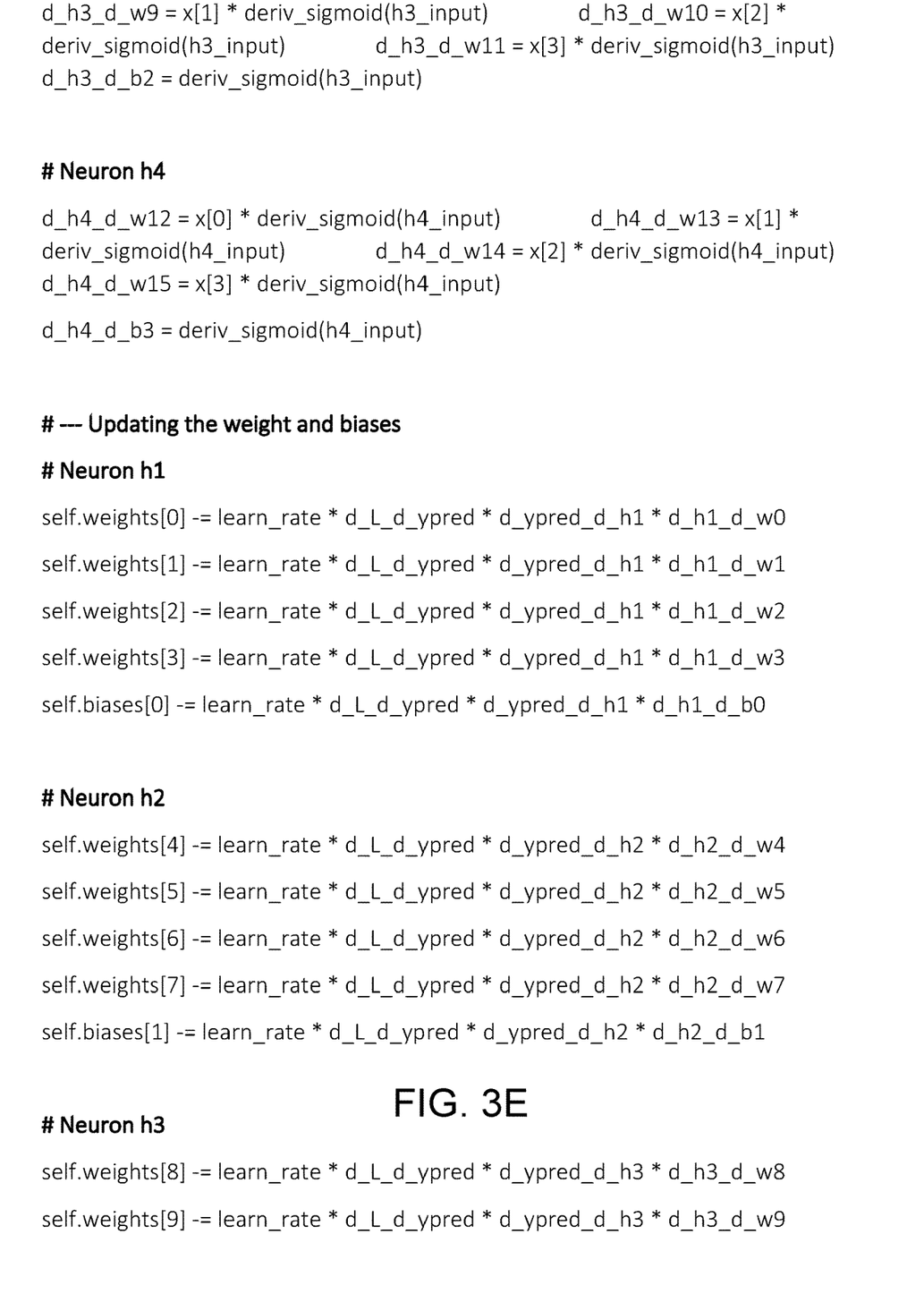
Figure 3F:
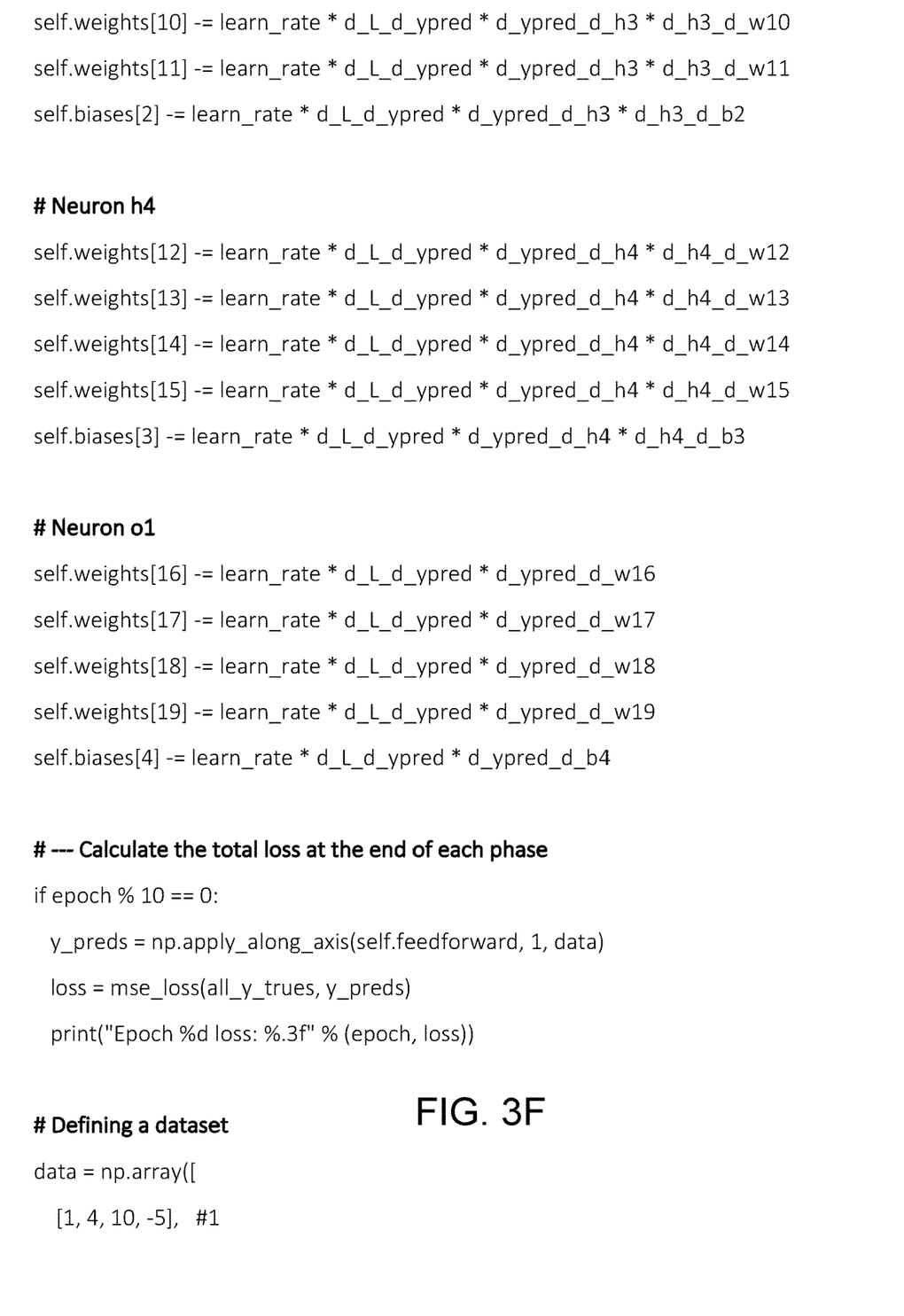
Figure 3G:
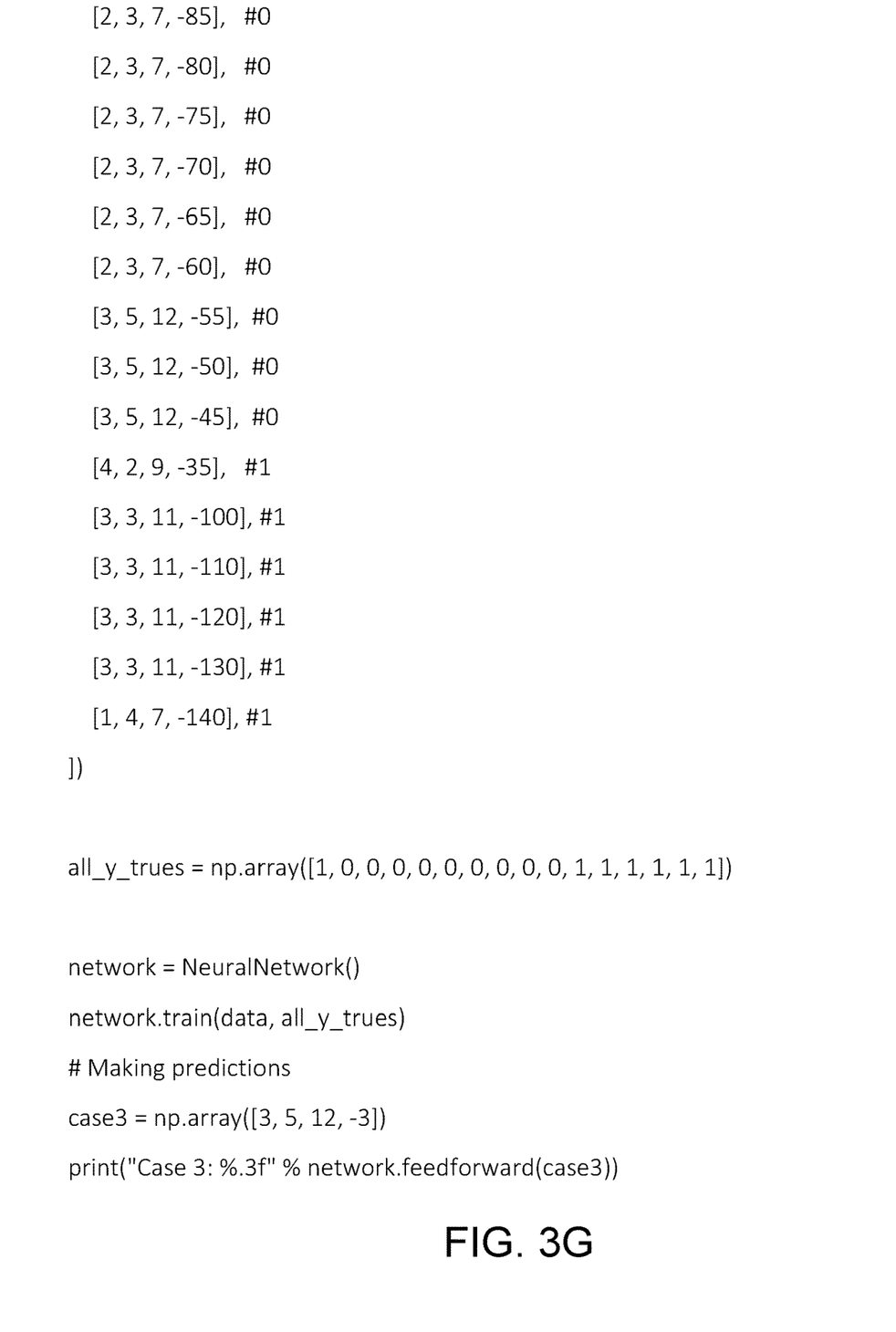
Figure 3H:
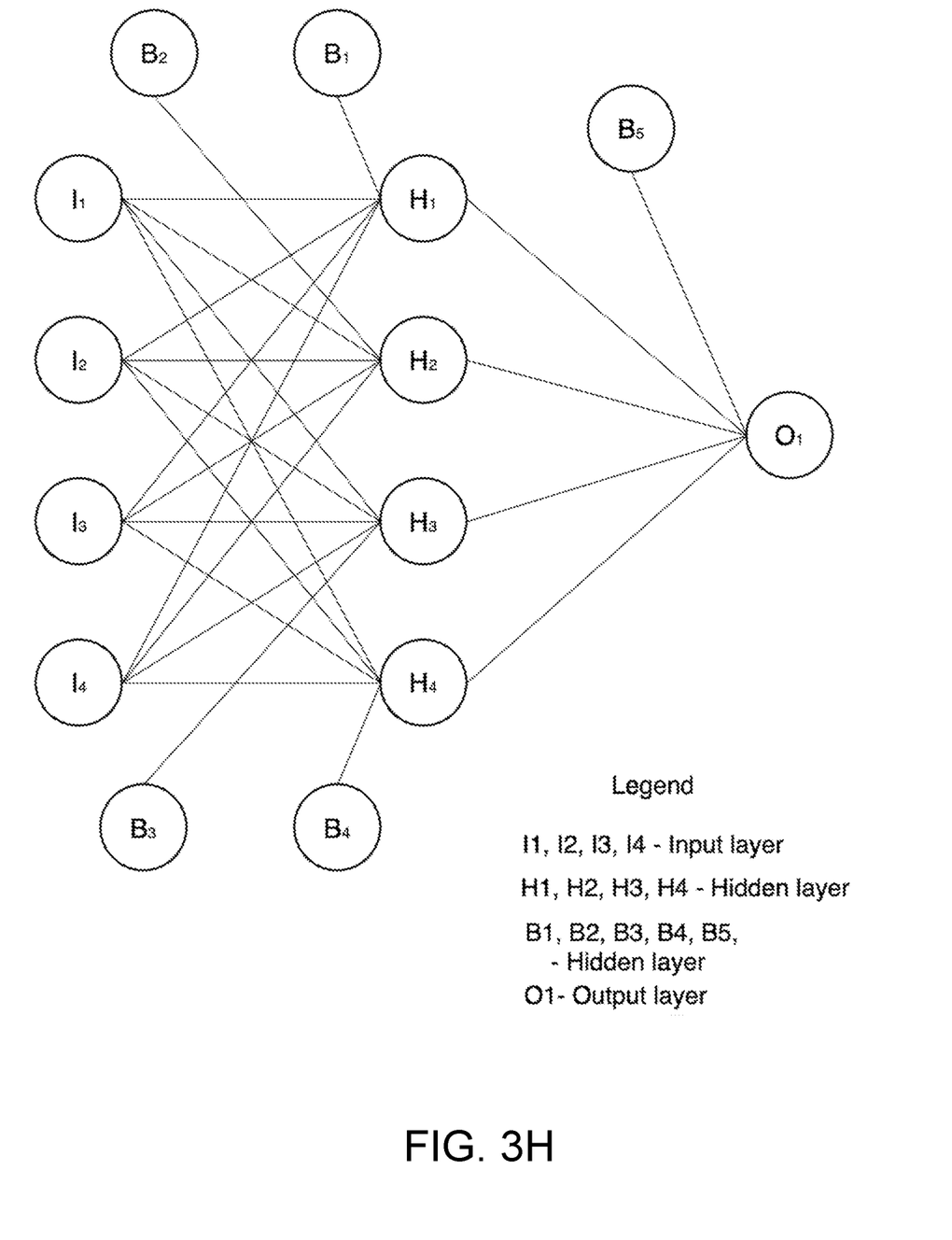
FIG. 3H is a diagram showing multiple layers of a neural network algorithm according to an embodiment of the present invention.
Figure 3I:
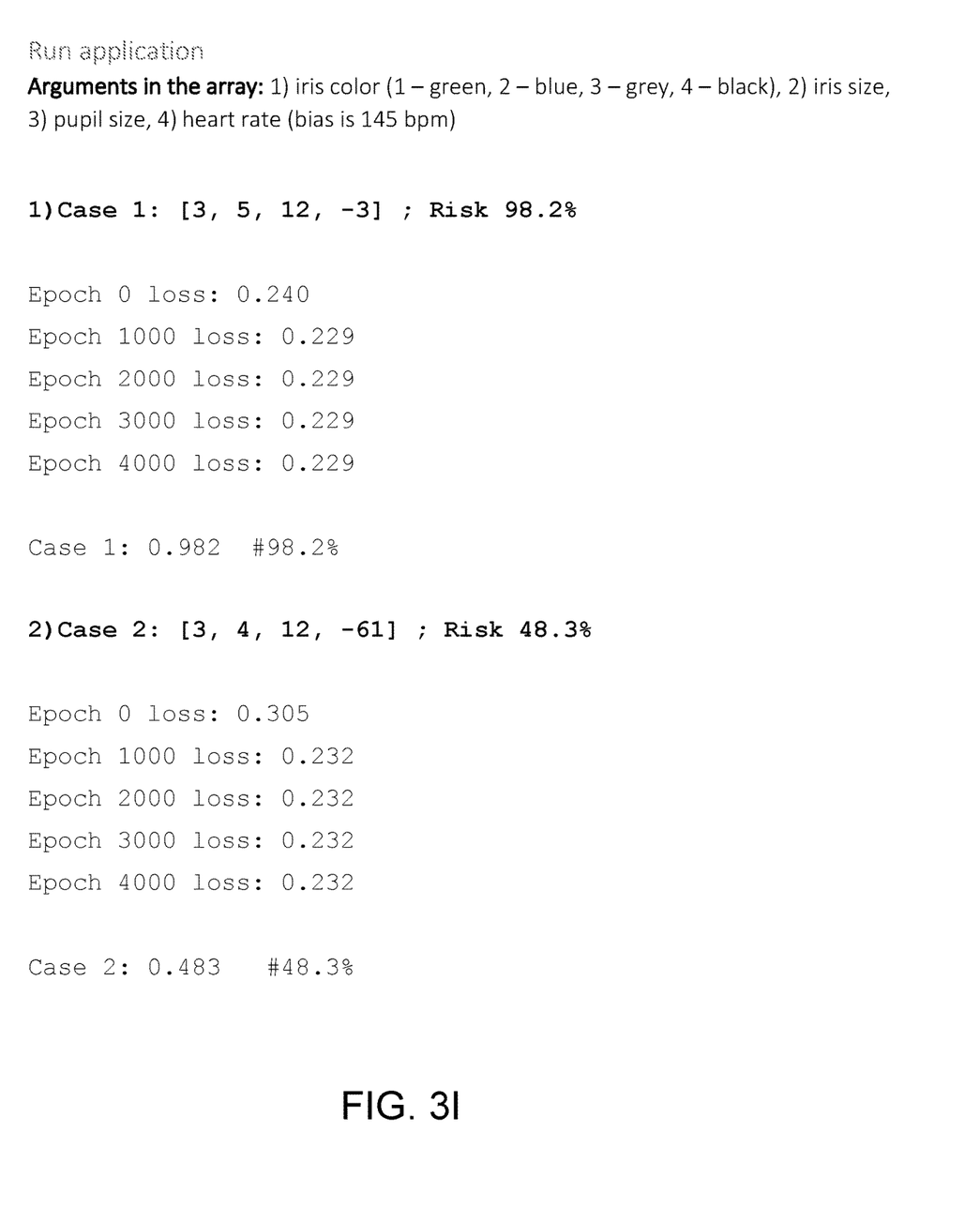
FIG. 3I shows a screenshot of an electronic device that can implement one or more aspects of an embodiment of the invention.

FIG. 3H is a diagram showing multiple layers of a neural network algorithm according to an embodiment of the present invention and FIG. 3I shows a screenshot of an electronic device running the source code in FIGS. 3A-3G that can implement one or more aspects of an embodiment of the invention While this invention has been described in conjunction with the embodiments outlined above, many alternatives, modifications and variations will be apparent to those skilled in the art upon reading the foregoing disclosure. Accordingly, the embodiments of the invention, as set forth above, are intended to be illustrative, not limiting. Various changes may be made without departing from the spirit and scope of the invention.

What is claimed is:

1. A computer system for determining onset of an acute coronary syndrome (ACS) event in a remote computing environment comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

capturing, using a camera, a first image at a first time of an iris and a pupil of an eye of a user;

responsive to capturing the first image, identifying in the first image a first iris information comprising a first pupil size;

capturing, using the camera, a second image at a second time of the iris and the pupil of the eye of the user;

responsive to capturing the second image, identifying in the second image a second iris information comprising a second pupil size;

determining a first change value in pupil size from the second pupil size to the first pupil size due to a light reflex;

capturing, using the camera, a third image at a third time of the iris and the pupil of the eye of the user;

responsive to capturing the third image, identifying in the third image a third iris information comprising a third pupil size;

capturing, using the camera, a fourth image at a fourth time of the iris and the pupil of the eye of the user, wherein the fourth image is captured after presentation of media that elicits a change in pupil size due to an emotional stimulus;

responsive to capturing the fourth image, identifying in the fourth image a fourth iris information comprising a fourth pupil size;

determining a second change value in pupil size from the third pupil size to the fourth pupil size due to the emotional stimulus;

determining whether the first iris information is within an allowable range of the second iris information and whether the third iris information is within an allowable range of the fourth iris information, wherein, if a difference in the first change value due to the light reflex has met a threshold and the difference in the second change value due to the emotional stimulus has met a threshold, the first iris information is not within the allowable range of the second iris information and the third iris information is not within the allowable range of the fourth iris information; and     responsive to determining whether the first iris information is within an allowable range of the second iris information and whether the third iris information is within an allowable range of the fourth iris information, providing an indication of a likely ACS event based on the second change value due to the emotional stimulus and at least one of a user history of ACS events, a health history of the user, genetic testing of the user, a family health history of the user, or a physical activity of the user.

2. The ACS event determination system according to claim 1, wherein the first iris information comprises comparing a location of the iris in the first image relative to a location of the pupil in the first image, and the second iris information comprises a location of the iris in the second image relative to a location of the pupil in the second image.

3. The ACS event determination system according to claim 2, wherein comparing the location of the iris in the first image relative to the location of the pupil in the first image comprises determining a three-dimensional cartesian distance between the location of the iris in the first image and the location of the pupil in the first image, and wherein comparing the location of the iris in the second image relative to the location of the pupil in the second image comprises determining a three-dimensional cartesian distance between the location of the iris in the second image and the location of the pupil in the second image.

4. The ACS event determination system according to claim 3, wherein the three-dimensional cartesian distance is determined using the formula: square root of $((X_2-X_1)^2+(Y_2-Y_1)^2+(Z_2-Z_1)^2)$, where $(X_1, Y_1, Z_1)$ is the center of the iris and $(X_2, Y_2, Z_2)$ is the center of the pupil for a single image.

5. The ACS event determination system according to claim 1, wherein the first iris information comprises a first color indication of the iris in the first image, and the second iris information comprises a second color indication of the iris in the second image, wherein the first color indication and the second color indication comprise any of an iris color or a corneal arcus color.

6. The ACS event determination system according to claim 1, wherein providing the indication of the likely ACS event comprises training a neural network by providing inputs including a plurality of iris images.

7. The ACS event determination system according to claim 6, wherein the inputs further comprise a plurality of HRV data.

8. The ACS event determination system according to claim 6, wherein the inputs further comprise a plurality of past cardiac events of the user.

\* \* \* \* \*